UNITED STATES PATENT OFFICE.

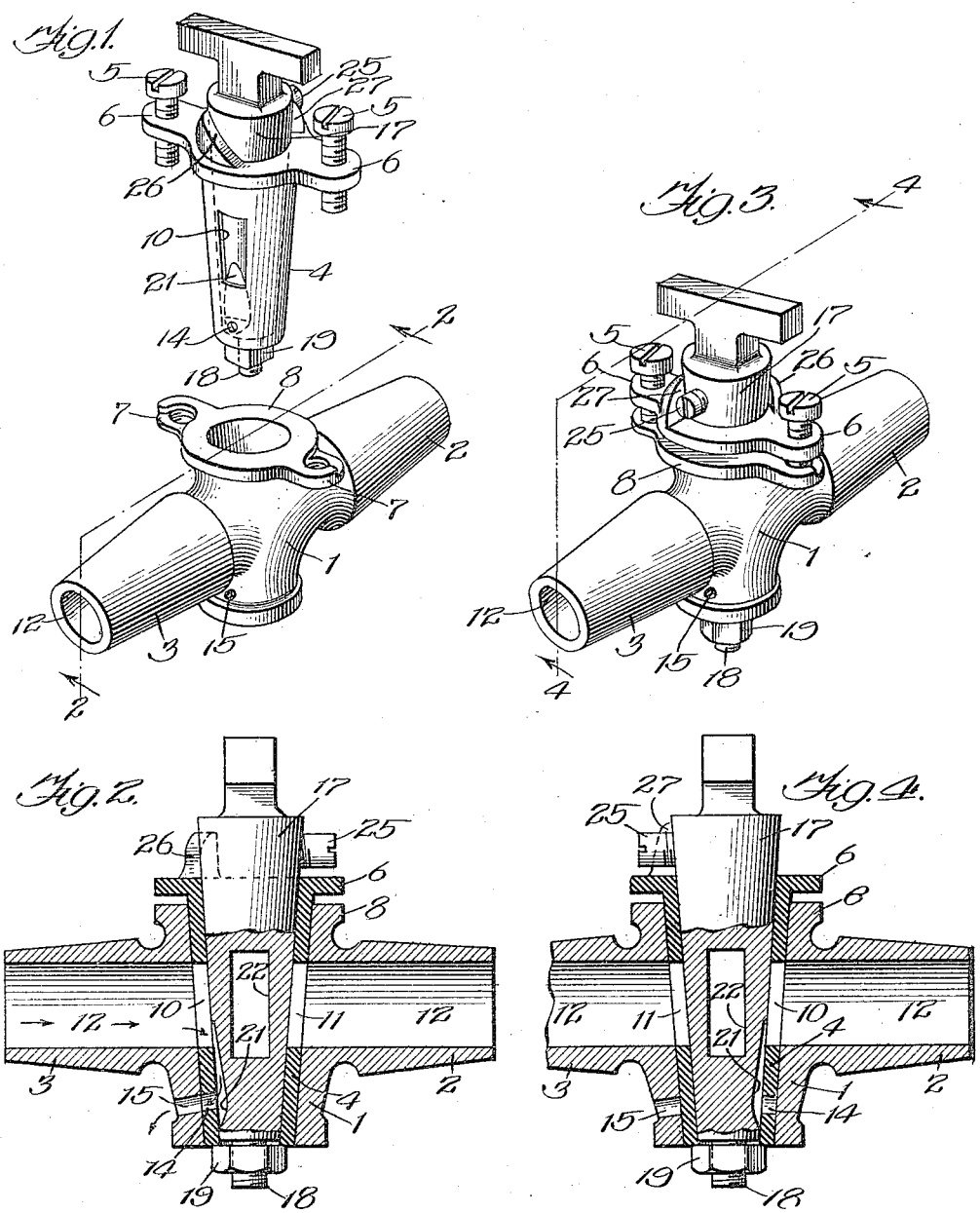
M. BLOCK.
VALVE.
APPLICATION FILED MAY 17, 1916.
1,214,267.
Patented Jan. 30, 1917.
Inventor:
Mandel Block.
By Cheever & Cox, Attys.

MANDEL BLOCK, OF CHICAGO, ILLINOIS.

VALVE.

1,214,267. Specification of Letters Patent. Patented Jan. 30, 1917.

Application filed May 17, 1916. Serial No. 98,070.

*To all whom it may concern:*

Be it known that I, MANDEL BLOCK, a citizen of the United States, residing at Chicago, in the county of Cook and State of Illinois, have invented a certain new and useful Improvement in Valves, of which the following is a specification.

My invention relates to valves, especially hand-operated valves of the type used for domestic and similar purposes.

As a particular instance of the utility of my invention, I would mention that in residences and apartment buildings, the water pipes are provided with valves by which the water may be shut off from the house pipes when desired. In some instances, it is desirable that when the water has been shut off from the house pipes, it should drain or waste away from them, so as to leave them empty, thereby preventing freezing and preventing the water from leaking into the house in case of damage to the pipes. In other cases, however, it is desirable that the water remain in the pipes when cut off from the service pipe. The valves for meeting these two different conditions are commonly referred to in the trade as "waste valves" and "plain stop valves", respectively.

One of the objects of my invention is to provide a construction which will combine, in a single valve, the ability to respond to the characteristics of either one of these valves.

Under many conditions, and especially in domestic use, these valves are not operated very frequently and have a tendency to corrode and deteriorate, due to the action of the water and the collection of sediment. The valves, therefore, have to be replaced periodically, and this involves considerable labor and usually the attention of a professional plumber.

It is one of the purposes of my invention to provide, in a double service valve, means whereby the coöperating parts may be removed without removing the valve casing.

Another object is to provide a construction such that the coöperating parts may all be removed by working from the top of the device, thus avoiding the need of having the operator go beneath the device for this purpose.

I accomplish my objects by mechanism illustrated in the accompanying drawings, in which:

Figure 1 is a perspective view of different parts of my device separated from each other to show how they come together. Fig. 2 is a longitudinal section on the line 2—2, Fig. 1. Fig. 3 is a perspective view of the parts as assembled. Fig. 4 is a sectional view on the line 4—4, Fig. 3. Figs. 2 and 4 are similar, except that in Fig. 2 the device is shown as a waste valve and in Fig. 4 as a plain stop valve.

Similar numerals refer to similar parts throughout the several views.

While a valve employing my invention may be used in different situations and may exhibit different designs, I have chosen to illustrate it as embodied in a plumber's valve for domestic purposes. In this type, the valve casing 1 has an inlet 2, which will be connected to the service pipes leading from the water main. On the opposite side it has an outlet 3, leading to the house pipes. In the particular form shown, the casing is adapted for "wiped joints" in distinction to "threaded joints" or "couplings". The casing is transversely chambered to receive a sleeve 4 which is tapered and fits snugly into the casing, being held there rigidly by suitable means. In the form illustrated, the sleeve is fastened by means of screws 5, 5, which pass through the lugs 6, 6 at the upper end of the sleeve and screw into corresponding lugs 7, 7, forming part of the flange 8 at the top of the casing. The screws are placed diametrically opposite to each other, so that the sleeve may be set in either one of two different positions, 180 degrees apart.

The sleeve has two ports 10 and 11, which register with the passage 12 in the valve casing. In consequence, the sleeve will always permit the passage of water, regardless of which of its two positions it occupies. On one side of the sleeve near the bottom is a drain port 14, which registers with the drain port 15 in the valve casing when the sleeve is in one of its two positions (see Fig. 2), and which is out of register with port 15 when in the other of its two positions (see Fig. 4).

The taper valve 17 fits within sleeve 4 and is held seated by any appropriate means. According to the design illustrated, a threaded shank 18 is formed at the lower end and this takes a nut 19 which is large enough to engage the lower end of the sleeve. In one side of the valve, near the lower end, a vertical passage 21 is formed, the upper end of this passage being high enough to communicate with the duct 12 in the casing, and the lower end low enough to communicate with the port 14. The valve has a central opening 22 leading diametrically through it on a level with the passage 12 in the casing. Consequently, when the said central opening is in line with the passage 12, water can flow past the valve, and when said central opening is crosswise with the passage, the water will be shut off. By rotating the valve 90 degrees, the central opening will be brought into line with or will be brought transversely to the line of the passage 12; and in order to confine the rotation of the valve within 90 degrees, I provide a stop screw 25, which screws into the side of the valve near the top and travels between two stop lugs 26 and 27 formed upon the upper end of the sleeve.

In operation, when it is desirable that the valve shall operate as a "plain stop," the sleeve and the casing are so assembled that the port 14 in the sleeve will come diametrically opposite to the port 15 in the casing, as shown in Fig. 4. Under these circumstances, the valve may be rotated to either open or closed position, but without permitting the device to drain. The port 14 will be opposite to a blank part of the casing, and the water will be unable to pass out. When it is desired to have the water in the house pipes drain out as soon as the valve is closed, the parts will be assembled in the manner shown in Fig. 2 with the port 14 in the sleeve registering with the port 15 in the casing. The water may be turned on or off by properly rotating the valve, and when the water is turned off, it will drain out from the house pipe through the passage 21, port 14 and port 15, as indicated by the arrows in Fig. 2. Thus, I am able to obtain either kind of service desired. The valve, when turned off, may either permit the water to drain from the house pipe or may hold it there, depending upon the position to which the sleeve is adjusted. Furthermore, my device exhibits all the advantages due to having a sleeve interposed between the casing and the valve. As previously suggested, valves used for domestic purposes are frequently left for long periods without attention or use, with the result that they become corroded and clogged with sediment. When this happens with my valve and the parts have become so imperfect that there is a leakage between the valve and the sleeve, all that it necessary is to remove the sleeve with the valve in it, and substitute either a new valve or a new sleeve or both. As the sleeve is not rotatable relatively to the casing for ordinary operation, the life of the casing is practically perpetual.

It will be noted that in my construction it is not necessary for the operator to reach to the bottom of the device to enable him to remove the valve and sleeve. He simply loosens the screws 5, 5, whereupon both the valve and the sleeve may be lifted out, the nut being of smaller diameter than the transverse chamber in the valve casing, and, hence, offering no obstruction to the withdrawal of the parts. This is of great importance, for devices of this kind are frequently placed underground or beneath the floor, where it is very difficult to get at them. With my construction, it is possible for the operator not only to see what he is doing, but to accomplish his purpose by operating solely from the top.

Having thus described my invention, what I claim as new and desire to secure by Letters Patent, is:—

1. In combination, a valve casing having a main passage extending through it for the passage of fluid, and having a chamber extending transversely to said passage, and having a drain port communicating with said chamber and non-communicating with said main passage, a sleeve fitting into the chamber in the casing and provided with a drain port, the drain port in the sleeve registering with the drain port in the casing when the sleeve occupies one position, and being out of register when the parts are assembled with the sleeve rotated to another position, the sleeve having main ports in line with the main passage in the casing, and a valve rotatably fitting into said sleeve and having a passage through it which may be brought into or out of register with the main ports of the sleeve by rotating the valve, said valve having a drain passage adapted, when the valve is in closed position, to conduct the fluid to the drain port in the sleeve from one of the main ports of the sleeve.

2. In a water service valve, a casing having a main passage extending through it and having a chamber extending transversely to the main passage and having a drain port in the side out of communication with the main passage, a sleeve fitting into the chamber in the casing, and having a drain port in the side registering with the drain port in the casing, when the sleeve is in one position, said drain ports being out of register when the sleeve is assembled in a different position 180 degrees from the first, the sleeve having main ports in the side, registering with the main passage in the valve casing for each of the two settings of the sleeve, and a valve fitting into the sleeve and having a main passage adapted to be brought into and out of register with the main ports of the sleeve by rotating the valve 90 degrees, the valve having a drain passage in the side for conducting the water from one of the main passages in the sleeve to the drain passage in the casing, when the valve is in closed position.

3. In a water service valve, a casing having a main passage extending through it and having a chamber extending transversely to the main passage and having a drain port in the side communicating with the chamber and non-communicating with the main passage, a sleeve seating in said chamber and having main ports registering with the main passage in the casing, the sleeve having a drain port in the side in register with the drain port of the casing when the sleeve is set in one position and out of register when the sleeve is set in a different position, a valve seating in said sleeve and having a main passage extending through it coming into and out of register with the main port in the sleeve when the valve is rotated, the valve having a drain passage in the side for conducting the water from one of the main ports in the sleeve to the drain port in the sleeve when the valve is closed, said sleeve being open at the bottom, and fastening means at the bottom of the valve engaging the bottom of the sleeve, the major dimension of the fastening means being less than the diameter of the sleeve, whereby the sleeve and the valve may be simultaneously lifted out of the casing without disassembling them.

4. In a water service valve, a casing having a main passage extending through it and having a chamber extending transversely to the main passage and having a drain port in the side communicating with the chamber and non-communicating with the main passage, a taper sleeve seating in said chamber and having main ports registering with the main passage in the casing, the sleeve having a drain port in the side in register with the drain port of the casing when the sleeve is set in one position, and out of register when the sleeve is reversed to a position 180 degrees from the first, a taper valve seating in said sleeve and having a main passage extending through it coming into and out of register with the main port in the sleeve when the valve is rotated, the valve having a drain passage in the side for conducting the water from one of the main ports in the sleeve to the drain port in the sleeve when the valve is closed, said chamber and said sleeve both being open at the bottom, and a fastening device for holding the valve seated, said fastening device having an external diameter less than the internal diameter of the chamber, whereby the sleeve and the valve may be lifted out without being taken apart.

In witness whereof, I have hereunto subscribed my name.

MANDEL BLOCK.

Copies of this patent may be obtained for five cents each, by addressing the "Commissioner of Patents Washington, D. C."